(No Model.)
O. KUTSCHE.
DUST COLLECTOR.
No. 407,598. Patented July 23, 1889.
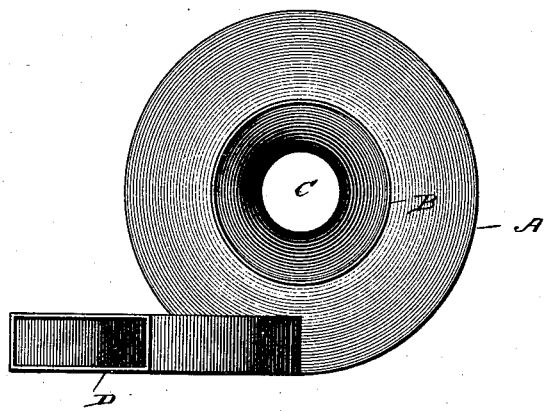
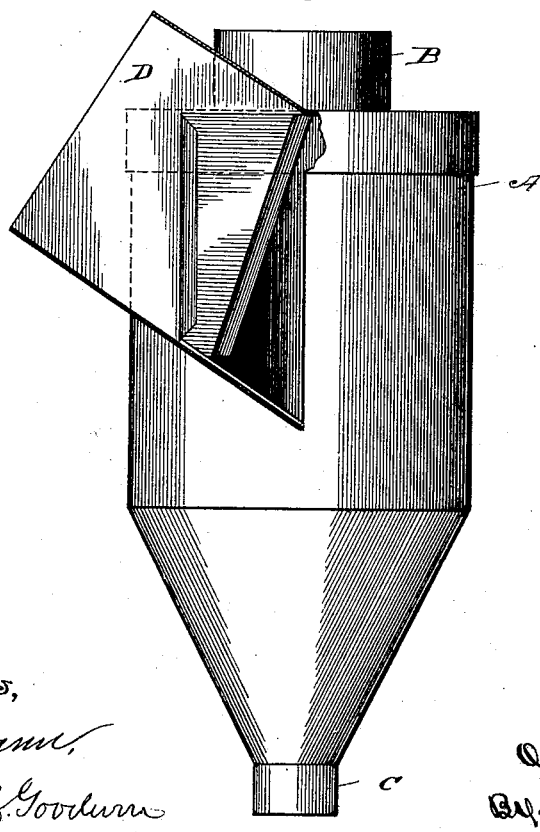
Witnesses,
Inventor,

UNITED STATES PATENT OFFICE.

OSWALD KUTSCHE, OF CHICAGO, ILLINOIS, ASSIGNOR TO THE CHICAGO EXHAUST AND BLOW PIPE COMPANY, OF ILLINOIS.

DUST-COLLECTOR.

SPECIFICATION forming part of Letters Patent No. 407,598, dated July 23, 1889.

Original application filed October 11, 1886, Serial No. 215,947. Divided and this application filed June 18, 1889. Serial No. 314,728. (No model.)

*To all whom it may concern:*

Be it known that I, OSWALD KUTSCHE, a citizen of the United States, residing at Chicago, Illinois, have invented certain new and useful Improvements in Dust-Collectors, of which the following is a specification.

My invention relates to that class of dust-collectors wherein the dust is separated from the air by centrifugal force acting upon the dust-particles in such manner as to drive them out of the air-current, while the purified air escapes in a different direction: and my invention more particularly relates to a dust-collector wherein the dust-laden air is delivered under blast to a separating-chamber constructed with an imperforate peripheral wall and with openings at opposite ends for the escape of the purified air and for the separated dust, the inlet-pipe entering the separating-chamber tangentially. A dust-collector of this kind is described in my application for Letters Patent of the United States, Serial No. 215,947, filed October 11, 1886, of which this application is a division.

The invention hereinafter described consists in a dust-collector of the type above described, which has the inlet-pipe for the dust-laden air entering the separating-chamber tangentially and with a downward inclination, whereby the dust-particles are not only given a gyrating motion within the chamber, but, because of the inclination of the inlet-pipe to the longitudinal axis of the chamber, the dust and waste are given an impulse toward the dust-discharge in the bottom of the chamber.

In the accompanying drawings, Figure 1 is a side elevation, partly in section, and Fig. 2 is a plan view, of a dust-collector embodying my invention.

In the drawings, A indicates the casing or wall of the chamber, which has the outlet B toward one end for the escape of the purified air, and the outlet C at the opposite end for the escape of the separated dust.

D is the inlet-pipe, which enters the separating-chamber tangentially and with a downward inclination. I prefer to have this pipe enter the chamber toward its top—*i. e.*, nearest the air-outlet. As the air enters it is given a whirling or gyrating motion by the curved walls of the chamber, and, because of the downward inclination of the inlet-pipe, the dust and waste are directed toward the waste-orifice.

I claim—

1. A dust-collector having a separating-chamber constructed with an imperforate peripheral wall and provided with a discharge-opening for the separated dust toward the bottom of said chamber, and with a discharge-opening for the purified air toward the top of the chamber, and an inlet for the dust-laden air entering the separating-chamber tangentially and with a downward inclination, substantially as described.

2. A dust-collector having a cylindrical separating-chamber constructed with an imperforate peripheral wall, and provided with a discharge-opening in its top for the purified air and with a discharge-opening in its bottom for the separated dust, and with an inlet-pipe for the dust-laden air entering the separating-chamber tangentially near its top and inclined toward the longitudinal axis thereof, substantially as and for the purpose described.

OSWALD KUTSCHE.

Witnesses:
T. D. BUTLER,
FREDERICK C. GOODWIN.